United States Patent [19]

Prince et al.

[11] 4,403,116

[45] Sep. 6, 1983

[54] TELEPHONE APPARATUS

[75] Inventors: Eric Prince, Chilwell; Walter P. Greenslade, Gedling; David J. Hickling, Chilwell, all of England

[73] Assignee: Plessey Overseas Limited, Ilford, England

[21] Appl. No.: 166,325

[22] Filed: Jul. 7, 1980

[30] Foreign Application Priority Data

Jul. 10, 1979 [GB] United Kingdom ............... 7924063

[51] Int. Cl.³ .......................................... H04M 1/02
[52] U.S. Cl. ................................ 179/100 D; 179/178; 179/179
[58] Field of Search ......... 179/90 FW, 100 R, 100 D, 179/178, 179, 90 A

[56] References Cited

U.S. PATENT DOCUMENTS

| 2,812,387 | 11/1957 | Safarik | 179/100 D |
| 3,637,949 | 1/1972 | Ruster et al. | 179/100 R |
| 3,657,487 | 4/1972 | Schwanck et al. | 179/100 R |
| 3,886,324 | 5/1975 | Hemming | 179/178 |

FOREIGN PATENT DOCUMENTS

| 2050430 | 4/1972 | Fed. Rep. of Germany | 179/100 R |
| 1125011 | 8/1968 | United Kingdom | 179/100 R |

Primary Examiner—G. Z. Rubinson
Assistant Examiner—Randall P. Myers
Attorney, Agent, or Firm—Fleit, Jacobson & Cohn

[57] ABSTRACT

The body for a telephone unit is designed to permit easy removal for maintenance and for initial assembly. The escutcheon plate which is a close fit to the dial is fitted in an oval hole which allows it to move on the body to clear the dial on removal of the telephone body.

8 Claims, 6 Drawing Figures

TELEPHONE APPARATUS

The present invention relates to a telephone apparatus, and more particularly to the problem of removal of the cover of a telephone subscriber's subset for maintenance.

With the present design of a subset, the escutcheon or the plate surrounding the dial of the subset, usually carrying the numbers and letters for the dial, must have a close fit around the base of the dial to prevent ingress of dirt. This makes removal of the cover difficult since the cover is "hinged" at the front, the cover being held by a single screw at the rear or top. When the cover is tilted, the escutcheon fouls on the dial, and this can result in damage to the escutcheon, or in difficulty in removing or replacing the cover.

It is an object of the present invention to provide a telephone subset cover which is more easily removable and replaceable than hithertofore.

Embodiments of the present invention will now be described, by way of example with reference to the accompanying drawings in which.

Figure 1:
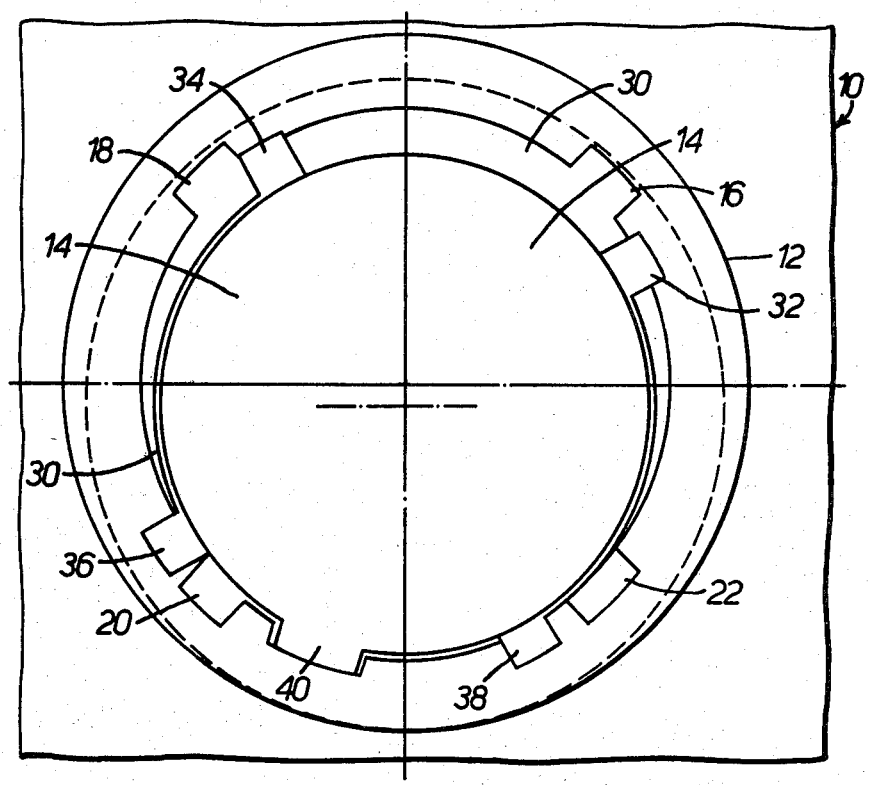
FIG. 1 shows, in underneath plan view, the escutcheon and top cover assembly of a telephone subset according to the present invention.

Referring now to FIG. 1, the cover 10 is provided with a reinforced portion 12 which has a circular hole 14. The hole 14 has cut out portions 16, 18, 20 22 found in its periphery; and, as seen in FIG. 1, the hole 14 has a diameter which is larger than the diameter of the dial, and larger than the internal diameter of the escutcheon plate 30.

Figure 5:
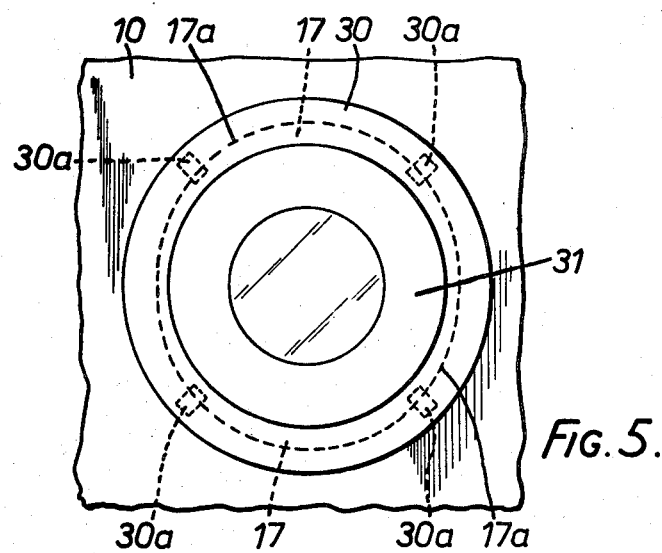
FIG. 5 shows another embodiment employing an oval hole in the cover plate.

As seen in FIG. 5, an oval hole 17 can be used in the cover 10 in conjunction with a circular dial 31 and an annular escutcheon plate 30.

Lugs 30a are carried by the plate 30 and engage side edges 17a of hole 17 so that plate 30 is movable with respect to cover 10.

Referring back to FIG. 1, the rest of the escutcheon plate 30 is visible through the hole 14, the escutcheon plate 30 carrying the numbers and/or figures required by each telephone administration. The plate 30 is circular and has four lugs 32, 34, 36, 38 which co-operate with the respective cut outs 16, 18, 20 22 in the cover 10 and allow the escutcheon plate 30 to be fitted onto the cover with the lugs inside the cover 10. When the escutcheon plate 30 is given a slight (15°) turn it is locked into the cover 10. The escutcheon plate 30 is prevented from turning back when the dial is in position by the finger stop (not shown) which fits into aligned cut out portions formed in the escutcheon plate 30 and cover 10 shown at 40.

It can be seen that the escutcheon plate 30 can slide upwards and downwards, (in relation to the paper,) in relation to the cover 10. Thus, when the telephone cover 10 is removed by pivoting about the front edge of base 29 (FIG. 3), the escutcheon plate moves to accommodate the hinging action of the cover 10. The hole 14 in plate 30 moves along a path defined by broken lines 11, 13 in FIG. 3. Thus, there is less likelihood of damage to the telephone. The lugs 32, 34, 36 and 38 are long enough to ensure retention of the escutcheon plate 30 at all positions of the cover 10.

Figure 2:
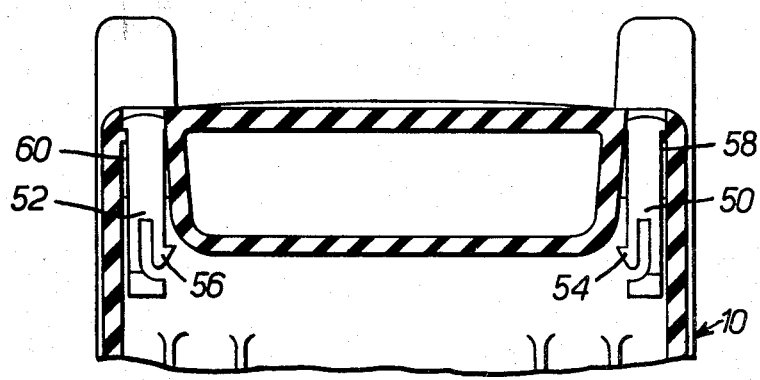
FIG. 2 shows part of the cradle switch assembly of the cover shown in FIG. 1.
Figure 3:
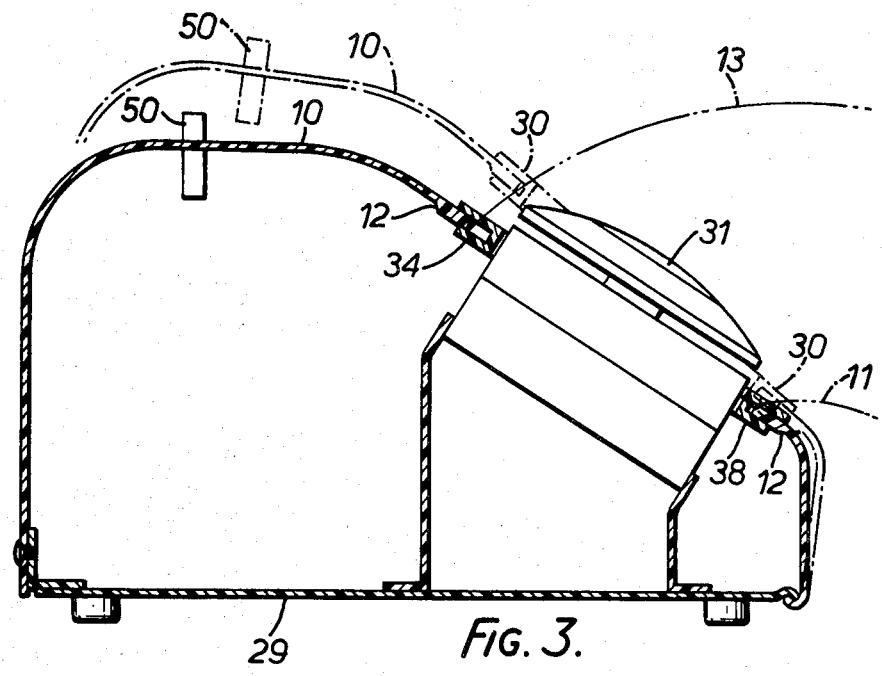
FIG. 3 is a cross-section view of the telephone subset along lines 3—3 of FIG. 1, and shows the cover in two different positions relative to the base, the cover being pivotable about the front edge of the base.

Referring now to FIG. 2, the cradle switch is usually operated by two long levers which are inserted through holes in the top of the cover 10. This also makes removal difficult because the lever is again required to be reasonably tight in fit for dust-proof purposes. In FIGS. 2 and 3, the long levers have been replaced with two short rods 50, 52 which protrude through the cover 10 of the telephone. The rods are inserted by forcing them downwards until spring members 54, 56 spring over stop members 58, 60 formed integrally with the cover 10. The rod members 50, 52 cannot then be removed from outside the telephone.

To operate the cradle switch spring set, the rod members 50, 52 co-operate with cupped members (not shown) and springs 54, 56 urge the rod members 50, 52 outwardly from the telephone subset.

The rod members 50, 52 are preferably made of plastics material.

Figure 4:
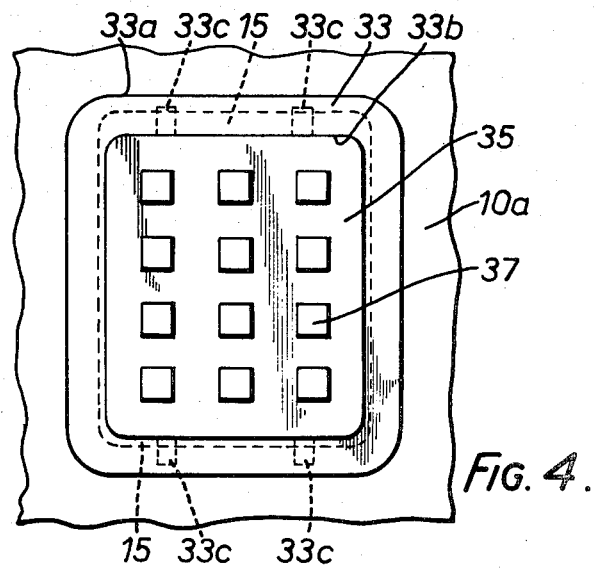
FIG. 4 shows one embodiment employing an essentially square escutcheon plate.
Figure 6:
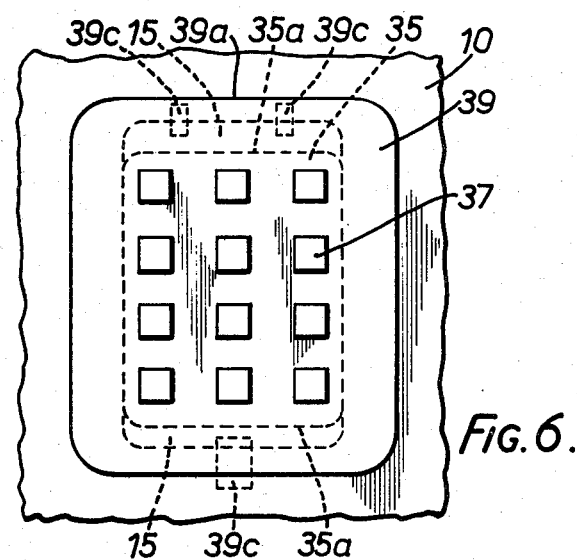
FIG. 6 shows another embodiment employing a rectangular push-button dial 35 in an extended hole in the cover of the telephone subset.

A similar method may be used in the case of a telephone having dialling means in the form of an array of pushbuttons instead of a rotary dial. An escutcheon plate 33 having an outer edge 33a, an inner edge 33b, and holding lugs 33c can be arranged around the push buttons 37 of the rectangular dial 35, as illustrated in FIG. 4. The lugs 33c extend from the inner edges 33b over edges of an orifice 15 in the cover 10a. Alternatively, as illustrated in FIG. 6, the push buttons 37 of a dial 35 having side edges 35a can project through the escutcheon plate 39. The plate 39 has an outer edge 39a and holding lugs 39c engaged with side edges of the orifice 15 in the cover 10b. In these cases the escutcheon plate may be substantially square in shape, as shown in FIG. 4, or may be rectangular in shape and held in a substantially rectangular hole in the telephone body by suitable lugs, as seen in FIG. 6. The escutcheon plate is still free to move relative to the body as in the above described embodiment to ease removal of the body.

What we claim is:

1. A telephone apparatus comprising a telephone subset, the telephone subset comprising fixed dialling means secured within the subset for permitting the operator to dial a number to be called, and a removable cover which is pivoted along one side of the subset, the cover having an orifice which is elongated in a direction perpendicular to the pivot axis of the cover and through which orifice the dialling means projects, the cover also being provided with plate means closely surrounding the dialling means for covering the gap between the orifice and the dialling means, said plate means being movable relative to the cover, whereby, when the cover is pivoted relative to the subset, the plate means moves along the elongated orifice, and the cover can be removed from the dialling means without the plate means fouling the dialling means.

2. A telephone apparatus as claimed in claim 1, wherein the dialling means comprises a circular rotary dial.

3. A telephone apparatus as claimed in claim 2, wherein the orifice is substantially circular in shape, and the portion of the orifice spaced furthest from the pivot axis of the cover is at a greater distance from the pivot axis than the edge of the dial furthest away from the pivot axis.

4. A telephone apparatus as claimed in claim 2, wherein the orifice is substantially elliptical in shape, the major axis of the elliptical shape being perpendicular to the pivot axis of the cover, and the portion of the orifice furthest from the pivot axis being spaced further from the pivot axis than the edge of the dial furthest away from the pivot axis.

5. A telephone apparatus as claimed in claim 2, wherein the plate means comprises an annular plate mounted over the edge of the orifice so as to surround the edge.

6. A telephone apparatus as claimed in claim 1, wherein the dialling means comprises an array of push buttons.

7. A telephone apparatus as claimed in claim 6, wherein the array of push buttons is substantially rectangular, and the orifice is also substantially rectangular in shape, but of greater length measured perpendicularly to the pivot axis.

8. A telephone apparatus as claimed in claim 7, wherein the plate means comprises a substantially rectangular plate which is mounted over the edge of the orifice so as to surround the edge.

* * * * *